Nov. 18, 1952 E. T. KNIPPEL 2,618,229
CHECKING AND MARKING ATTACHMENT FOR PLANTERS
Filed Feb. 25, 1947 3 Sheets-Sheet 3
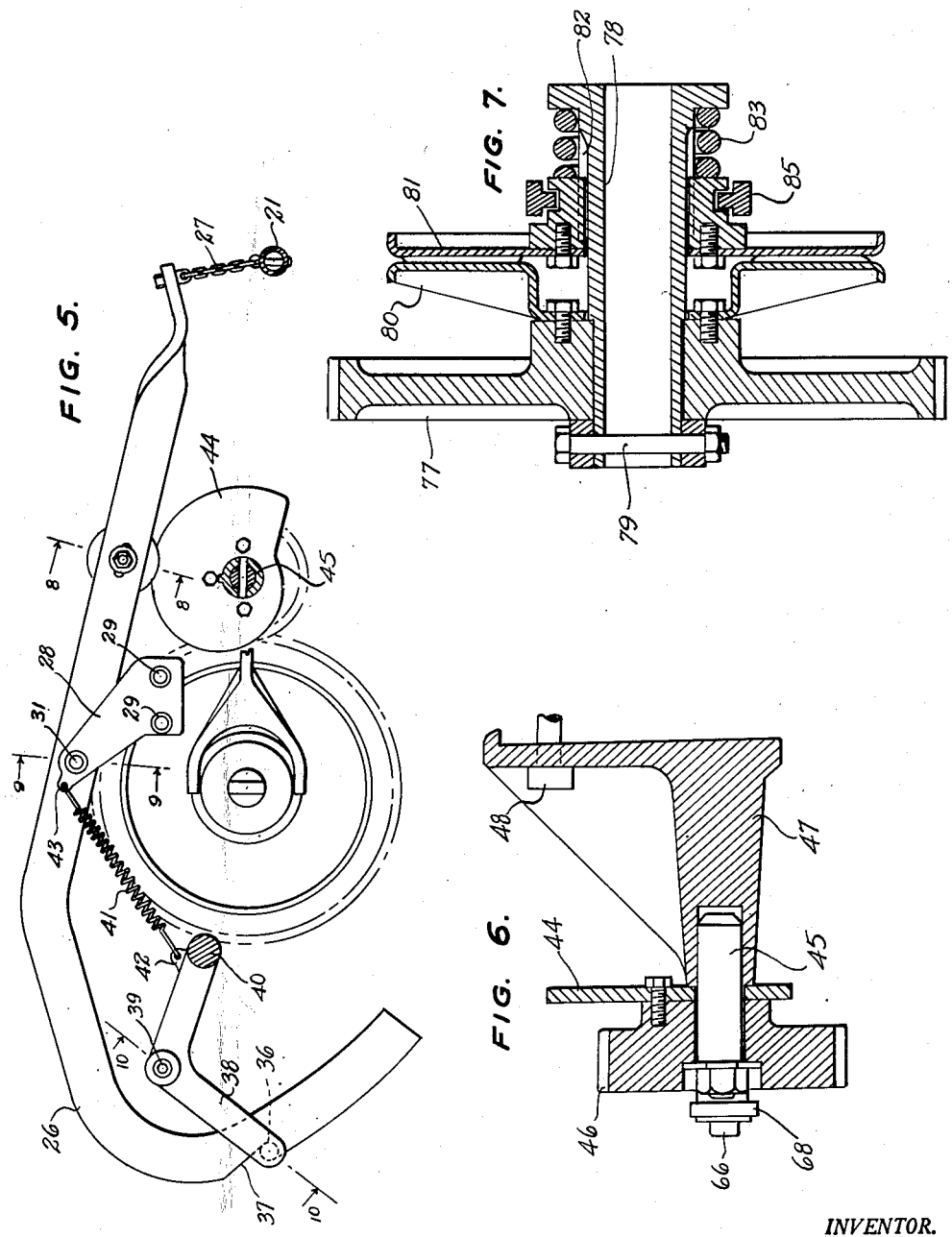
INVENTOR.
ELVIS T. KNIPPEL,
BY
McMorrow, Berman & Davidson
ATTORNEY.

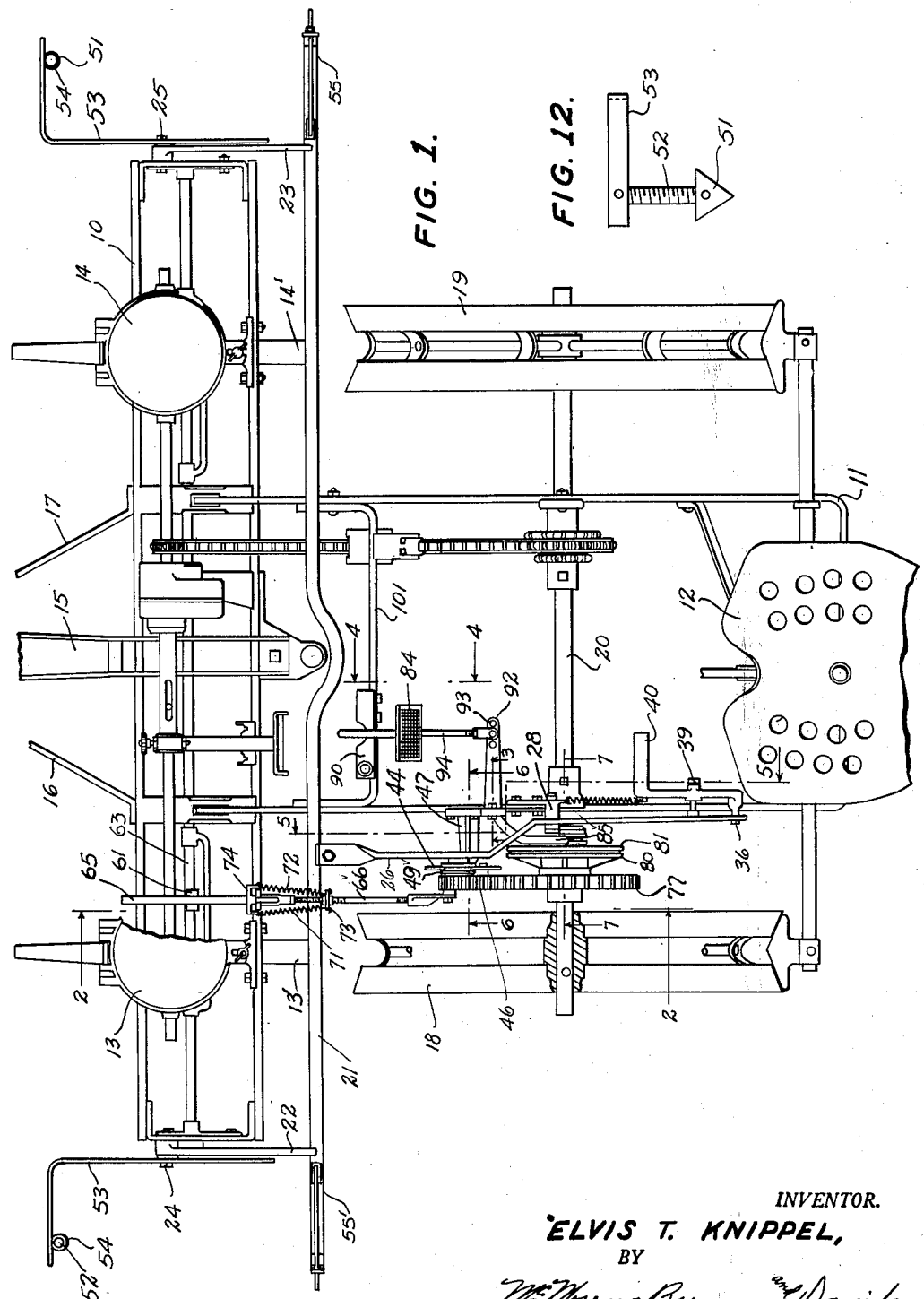

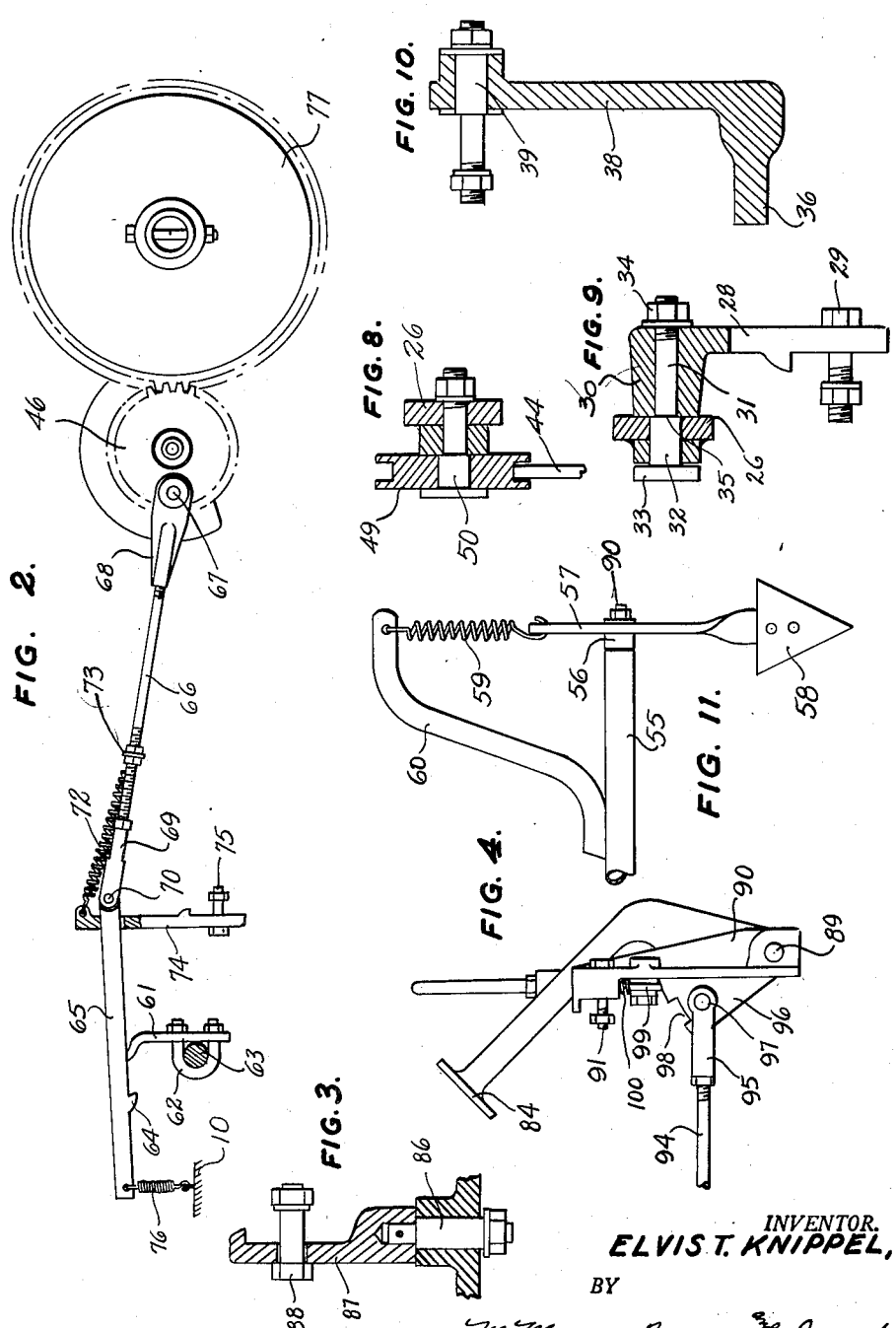

Patented Nov. 18, 1952

2,618,229

UNITED STATES PATENT OFFICE 2,618,229

CHECKING AND MARKING ATTACHMENT
FOR PLANTERS

Elvis T. Knippel, Monee, Ill.

Application February 25, 1947, Serial No. 730,712

1 Claim. (Cl. 111—30)

This invention relates to corn planters of the checking type, wherein, as an illustration, several kernels of corn are dropped every three feet, four inches in rows three feet, four inches apart providing hills equally spaced in both directions, and in particular includes an improvement wherein means is provided on the frame of the machine for following a row at one side and indicating another row at the opposite side, and, furthermore, includes means for setting the checking attachment at the beginning of each row, wherein hills at the ends of the rows may be aligned to compensate for uneven edges at the sides of fields and angularly disposed fence rows.

The usual type of corn planter used in checking includes a check wire that runs continuously the entire length of the field and a disc on a comparatively long pivotally mounted arm that may be actuated from side to side to follow the last planted row. The corn planter must be provided with a comparatively large spool for holding the wire and the wire must be moved ahead every time the planter reaches the end of the field. The long pivotally mounted disc arm is objectionable because it interferes with the connection to a tractor, and also with the lines when the planter is drawn by horses.

With these thoughts in mind, this invention contemplates improvements in a corn planter wherein the chain with the spool therefor and the disc with the relatively long pivotally mounted arm are replaced by attachments permanently incorporated in the corn planter.

An object of this invention is to provide improvements in corn planters wherein the checking attachment for dropping the corn may readily be adjusted and in which attachments are provided at the sides for following the last planted row and also for indicating the next row on the opposite side of the planter.

Another object of the invention is to provide means on a corn planter having a checking attachment in which the actuating means of the checking attachment may be stopped and started and also adjusted while the planter is in operation.

A further object of the invention is to provide means for suspending a point from the side of a corn planter wherein the point may be dropped to provide a mark in alignment with planted hills to indicate the starting point of the return run.

A still further object of the invention is to provide an improved attachment for corn planters that makes it possible to eliminate the checking chains and follower disc that may be attached to planters now in use, and which is of a simple and economical construction.

With these and other objects in view, the invention embodies a bar extending transversely across the frame of a corn planter positioned behind the grain supply containers with extending arms at the ends having vertically positioned pointers suspended thereby, a trip for actuating the checking attachment and suitable levers and operating instrumentalities positioned on the frame of the planter adjacent the seat for adjusting and controlling the checking attachment and indicating and follower pointers.

Other features and advantages of the invention will appear from the following description taken in connection with the drawings, wherein:

Figure 1 is a plan view of the chassis of a corn planter with the attachments mounted thereon, and with parts broken away.

Figure 2 is a detail showing an eccentric for actuating the checking attachment with the frame of the corn planter omitted.

Figure 3 is a detail on line 3—3 of Figure 1, showing a post for pivotally suspending the clutch-actuating lever from the frame.

Figure 4 is a detail on line 4—4 of Figure 1, illustrating a bracket for supporting the foot lever.

Figure 5 is a detail taken on line 5—5 of Figure 1, illustrating the foot control lever through which the pointers and followers are actuated.

Figure 6 is a detail on line 6—6 of Figure 1, showing a section through the eccentric gear mounting.

Figure 7 is a cross-section on line 7—7 of Figure 1, illustrating the main gear and friction disc assembly of the axle with the axle omitted.

Figure 8 is a detail showing a section through the cam roller on line 8—8 of Figure 5.

Figure 9 is a detail on line 9—9 of Figure 5, illustrating a bracket for mounting the indicating actuating lever on the main frame of the corn planter with the frame omitted.

Figure 10 is a detail showing a section on line 10—10 of Figure 5, illustrating the spring-actuated stop pin lever.

Figure 11 is a detail illustrating a bracket with a spring for resiliently supporting a marking pointer at one side of the corn planter.

Figure 12 is a detail illustrating a pointer providing a follower extended at the forward side of the corn planter chassis and extending from one end thereof.

Referring now to the drawings, wherein like reference characters indicate corresponding parts, the corn planter attachment of this invention is mounted on a chassis of a corn planter having a rectangularly-shaped transverse auxiliary frame section 10 and a rectangularly-shaped longitudinal main frame section 11 extending backward therefrom. A seat 12 is supported above the section 11 and grain boxes or containers 13 and 14 are supported above the frame 10 over conventional depositing chutes 13' and 14' respectively, carried by frame 10. The frame is also provided with a tongue 15 extending from the forward side thereof and mounted between brackets 16 and 17. The corn planter chassis is supported on wheels 18 and 19 through an axle 20.

The row marking, indicating and follower attachment of this invention includes a transversely disposed bar 21 arranged to the rear of frame 10 and spaced from the latter. Positioned adjacent one end of the frame 10 is a longitudinally disposed arm 22 having one end pivotally connected to the frame as indicated by the reference numeral 24, the other end of the arm 22 being fixedly secured to the bar 21 adjacent to and spaced from the end 55' thereof. Spaced from the other end of the frame 10 and arranged in parallel relation with respect to the arm 22 is another longitudinally extending arm 23, one end of the arm 23 being pivotally connected to the frame 10 as indicated by the reference numeral 25, with the other end thereof being fixedly secured to the bar 21 adjacent to and spaced from the end 55 of the bar 21. The bar 21 is suspended from an actuating lever 26 through a chain 27, as illustrated in Figure 5. The lever 26 is pivotally mounted on the frame 11 through a bracket 28, the lower end of the bracket being bolted to a side member of the frame by bolts 29 and the lever being pivotally mounted in a hub 30 at the upper end of the bracket on a bolt 31 having an enlarged bearing surface 32. The bolt is provided with a head 33 and is secured in the hub 30 by a nut 34 that holds a shoulder 35 against the end of the hub, as shown in Figure 9. The lever 26 is held in the raised position by a pin 36 extending into a notch 37 in the lever and the pin is mounted on a bell crank lever 38 which is pivotally mounted on the frame 11 through a bolt 39 and provided at the opposite end with a bar or projection 40 which extends outward below the seat 12 so that it may be actuated by a foot of the operator. The lever 38 is resiliently held in locking position shown in Figure 5 by a spring 41, one end of which is attached to an ear 42 on the upper surface of the lever and the other to a projection 43 at the end of the bracket 28. It will be noted that by pressing the bar 40 downward, the pin 36 will move up out of the notch 37 in the arcuate end of the lever 26 and will permit the lever to swing about the pivot 31 so that the bar 21 suspended on the opposite end may drop.

Each of the ends 55, 55' of the bar 21 carries a marker which is mounted for up and down movement with respect to a ground surface. Since the specific structure of each of the markers is the same only one will be described in detail. By reference to Figure 11, the end 55 of the bar 21 is provided with a sleeve 56 mounted rotatably upon a stud 90 extending outwardly from and aligned coaxially with said end 55 of the bar. A rod 57 is rigidly secured to the outer end surface of said sleeve, the stud extending through and projecting beyond said rod. A nut is threaded on the stud 90 and a washer is interposed between the nut and rod. The lower end of the rod 57 carries a marking element 58 and the other end of the rod 57 is connected, by means of a coil spring 59, to an end of an upstanding bracket 60 carried by the end 55 of the bar 21. Thus, the rod swings about a horizontal axis defined by the stud 90, and will normally be swung out of a vertical position each time it is dropped to engage the marking element 58 in the ground. Swinging of the rod to a position inclined from the vertical occurs because the planter will move forwardly slightly while the marking element is still engaged with the ground. When the rod is raised, the spring 59 will act to return it to a vertical position.

The lever 26, in its unlocked position with the projection 40 pressed down and the pin 36 out of the notch 37, is actuated by a cam 44 on the shaft 45 of the pinion 46, the shaft being mounted in a bracket 47 suspended from the side of the frame 11 and attached thereto by bolts 48. A roller 49, freely rotatable on a pin 50 extending from the side of the lever 26, as illustrated in Figure 8, rides upon the cam 44, and as the cam rotates in a counter-clockwise direction, the roller carries the forward end of the lever 26 upward, thereby elevating the bar 21. Continued rotation of the cam has the effect of lowering the bar 21 and lowering the marking elements 58 carried by the ends 55, 55' of the bar 21 into engagement with the ground surface thereby marking the impressions indicating locations of hills aligned both longitudinally and transversely with the rows.

Slidably supported on each of the bolts 24, 25 is an L-shaped arm, generally designated by the reference numeral 53. As the specific structure of each of the arms 53 and the pointer elements carried thereby is the same only one will be described in detail. Referring to Figure 12 there is shown the long leg of the L-shaped arm 53 slidably supported on the bolt 24 with the short leg thereof being disposed in spaced parallel relation with respect to the end 55 of the bar 21. Dependingly supported adjacent the free end of the short leg of the L-shaped arm 53 is a post 52. Fixedly secured to the lower end of the post 52 is a pointer 51. It is to be noted that the post 52 is threaded throughout its length and has its upper end in threaded engagement within a socket 54 provided on the short leg of the L-shaped arm 53. Accordingly the pointer 51 may be adjusted with respect to the ground surface.

It is to be understood that the post 52 is of such a length as to cause the pointer 51 to be disposed at all times above the ground surface.

The corn-checking attachment is actuated by a trigger 61 mounted by a clamp 62 on a bar 63 which extends through the corn supply containers 13, 14 and actuates the kernel-dropping instrumentalities therein, and the trigger 61 is actuated by a pawl 64 on a bar 65, the rear end of which is pivotally attached to a rod 66, the opposite end of which is pivotally mounted on a pin 67 eccentrically positioned on the pinion 46, as illustrated in Figures 2 and 6. The rod 66 is threaded, for adjustment, at each end with one end threaded into a socket 68 which is pivotally mounted on the pin 67 and the other end into a socket 69 by which the rod is pivotally attached to the bar 65 through a pin 70. The rod is resiliently held by springs 71 and 72 which are attached at one end to a collar 73 on the bar, and at the other to a bracket 74 extending upward from the frame 10 upon which the bracket is mounted by bolts 75. The springs 71 and 72 pull the bar 65 ahead for starting position when a pedal 84 controlling a clutch described later is released. The forward end of the bar 65 is resiliently held downward against the trigger 61 by a spring 76, one end of which is attached to the bar and the other to the frame 10.

The pinion 46 meshes with a large gear 77 on a bushing 78 that is mounted on the axle 20 of the corn planter and secured thereon by a bolt 79. The gear 77 is freely rotatable on the bushing and is secured at one side to a freely rotatable element 80 of a clutch with serrated teeth, the fixed element 81 of which is keyed to the bushing 78 through a key 82, as shown in Figure 7. The clutch is normally held in operative position by spring 83 and is thrown out by a foot lever 84 connected to the opposite end of a clutch-control lever 85 which is pivotally mounted on a pin 86 in a bracket 87 extending downward from frame 11 to which the bracket is secured by a bolt 88.

The foot lever 84 is pivotally mounted on a pin 89 in the lower end of a bracket 90 which is suspended from the frame 11, being attached thereto by bolts 91, as shown in Figure 4. The clutch control lever 85 is provided with an inwardly extending end 92 having a plurality of openings 93 therein by which it is connected to the foot lever by a rod 94 having a yoke 95 adjustably held on the end thereof, and the yoke 95 is pivotally attached to a segment 96 on the inner side of the foot lever by a pin 97. The upper surface of the segment 96 is provided with notches 98 in which a latch 99 resiliently held downward by a spring 100 may snap to hold the foot lever in different operative positions. The frame 11 is provided with a cross-member 101 upon which the bracket 90 is positioned, as illustrated in Figure 1. It will be noted that the spring 83 normally holds the clutch element 81 against the element 80, wherein the clutch is in operative position, and when the corn planter is turning around at the end of the row, the foot lever may be pressed downward to throw out the clutch by drawing the end 92 of the clutch lever forward, and by this means the checking attachment is released so that it is not operating as long as the foot lever is held downward. After the machine has turned the corner, the machine is maneuvered to locate one of the pointers 51 immediately above the last depression formed in the previous row by one of the marker elements 58. The pointer 51 is in this way brought into register with the last depression indicated by one of the elements 58, and then the foot lever is released, and the checking attachment will start to operate from this point, wherein the hills of the new rows will be in alignment with those of the planted rows. The arms 53 are provided with elongated slots not shown, through which the bolts 24 and 25 extend, whereby the arms are adjustable in the direction of their lengths. Adjustment of the arms 53 in this manner is effective to shift the pointers 51 longitudinally of the corn planter, so that the position of the pointers 51 may be so established that releasing the lever 40, at the moment the pointer 51 is over a mark previously made by a marker element 58, will cause dropping of the marker element 58 in the new row at a location aligned transversely with the hills made in the previous rows, and will further cause the checking attachment to drop kernels of corn at locations aligned transversely of the rows with the hills made in the previous rows.

The improved corn planter checking and marking attachment of this invention includes, therefore, a checking actuator operated by an eccentric from the axle of the traction wheels of the planter and indicating and marking points suspended from the extreme ends of the planter frame, wherein the checking attachment, markers, and pointers are synchronized to drop grains of corn at regular spaced intervals and mark hills for the next row in alignment with the planted hills.

In operation, the containers on the planter may be filled with grains of corn, and as the planter is drawn across the field, the pinion 46 will actuate the checking attachment to drop the corn in the usual manner, and at the same time the cam will actuate the marking elements 58 with a reciprocating movement, wherein the marking elements 58 will drop downward to make impressions registering with the hills into which the grains of corn are dropped. In turning the planter around at the end of the row, the clutch actuating the checking attachment is thrown out and the clutch is held out by the foot of the operator with the operator in the seat of the planter until the planter is turned completely around and brought into position for travel in the opposite direction. The planter is then moved until one of the pointer elements 51 registers with the last impression made by one of the marker elements 58, whereupon the clutch lever is released, resulting in throwing of the checking attachment into gear and the operation of the corn planter in said opposite direction.

The attachments are illustrated as mounted on a corn planter of the general type, and it will be understood that modifications may be made in the design and arrangement of the parts wherein the attachment may be made adapted for substantially any type of planter.

What is claimed is:

A checking and marking attachment for connection to a corn planter having a main frame of generally elongated formation and an auxiliary frame arranged transversely of said main frame and carrying a plurality of transversely spaced corn depositing devices, said attachment comprising a bar positioned transversely of said main frame and spaced from said devices, arms extending from said bar at locations spaced inwardly from the respective ends of the bar but disposed beyond and having pivotal connections with the respective ends of the auxiliary frame to mount the bar for pivotal up and down movement relative to the frame, markers carried at said ends of the bar for engagement with the ground on opposite sides of the planter upon downward pivotal movement of said bar, each of the markers being aligned transversely with said corn depositing devices and being spaced from the device nearest thereto a distance equal to half the distance between adjacent rows, pointers disposed in spaced relation with respect to the associated markers and operatively connected to said frame for adjustable positioning of the pointers at a selected distance from the markers, said pointers being disposed forwardly of their associated markers and being aligned therewith longitudinally of the planter, and means operatively connected to said bar and to said corn depositing devices for effecting the pivotal up and down movement of said bar in timed relation to the depositing of corn as the pointers pass over marks previously made by the markers, said means comprising a pinion mounted upon the planter for rotation responsive to forward movement of the planter, a pitman connected to the pinion for reciprocation upon rotation of the pinion, trigger means actuated by reciprocation of the pitman and operatively associated with the respective corn depositing devices to effect the periodic deposit of corn from said devices upon each rotation of the pinion, a cam secured to the pinion for rotation therewith, and a lever pivoted upon the frame and riding upon the cam for up and down movement of the lever responsive to each rotation of the cam, said lever being connected to the bar for lowering the markers into engagement with the ground simultaneously with deposit of the corn.

ELVIS T. KNIPPEL.

REFERENCES CITED

The following references are of record in the file of this patent:

UNITED STATES PATENTS

| Number | Name | Date |
| --- | --- | --- |
| 20,656 | Morehouse | June 22, 1858 |
| 550,015 | Buck | Nov. 19, 1895 |
| 875,894 | Christiansson | Jan. 7, 1908 |
| 927,607 | Shular | July 13, 1909 |
| 1,073,269 | McProud | Sept. 16, 1913 |
| 1,114,385 | Randall | Oct. 20, 1914 |
| 1,115,544 | Hutton | Nov. 3, 1914 |
| 1,215,943 | Laugen et al. | Feb. 13, 1917 |
| 1,265,566 | Wilkey | May 7, 1918 |
| 1,329,964 | Foncannon | Feb. 3, 1920 |
| 1,372,637 | Atz | Mar. 22, 1921 |
| 1,483,815 | Kohlhaas | Feb. 12, 1924 |
| 1,635,435 | Richardson | July 12, 1927 |
| 1,728,399 | DeNune | Sept. 17, 1929 |